United States Patent
Hall et al.

(10) Patent No.: US 8,800,261 B2
(45) Date of Patent: Aug. 12, 2014

(54) GAS TURBINE ENGINE WITH NOISE ATTENUATING VARIABLE AREA FAN NOZZLE

(75) Inventors: Andre M. Hall, East Hartford, CT (US); Oliver V. Atassi, Longmeadow, MA (US); Jonathan Gilson, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 999 days.

(21) Appl. No.: 12/838,620

(22) Filed: Jul. 19, 2010

(65) Prior Publication Data
US 2012/0011825 A1    Jan. 19, 2012

(51) Int. Cl.
*B63H 11/00* (2006.01)
*F02K 3/06* (2006.01)
*F02K 1/09* (2006.01)

(52) U.S. Cl.
CPC ... *F02K 1/09* (2013.01); *F02K 3/06* (2013.01); *F05D 2260/96* (2013.01)
USPC ............................. 60/204; 60/226.3; 60/232

(58) Field of Classification Search
USPC .................... 60/204, 226.1, 226.3, 232, 770
See application file for complete search history.

(56) References Cited

U.S. PATENT DOCUMENTS

| | | | |
|---|---|---|---|
| 3,598,318 A | 8/1971 | Schiel | |
| 3,610,262 A | 10/1971 | Wise | |
| 8,505,307 B2 * | 8/2013 | Wang | 60/771 |
| 2009/0277155 A1 * | 11/2009 | Bulin et al. | 60/226.3 |
| 2010/0229528 A1 * | 9/2010 | Ramlaoui et al. | 60/226.2 |

FOREIGN PATENT DOCUMENTS

JP          2009 85207    *    4/2009

* cited by examiner

*Primary Examiner* — Charles Freay
(74) *Attorney, Agent, or Firm* — Carlson, Gaskey & Olds, P.C.

(57) ABSTRACT

A bypass gas turbine engine includes a variable area fan nozzle with a leading edge region that defines an increased airfoil leading edge radius.

5 Claims, 6 Drawing Sheets

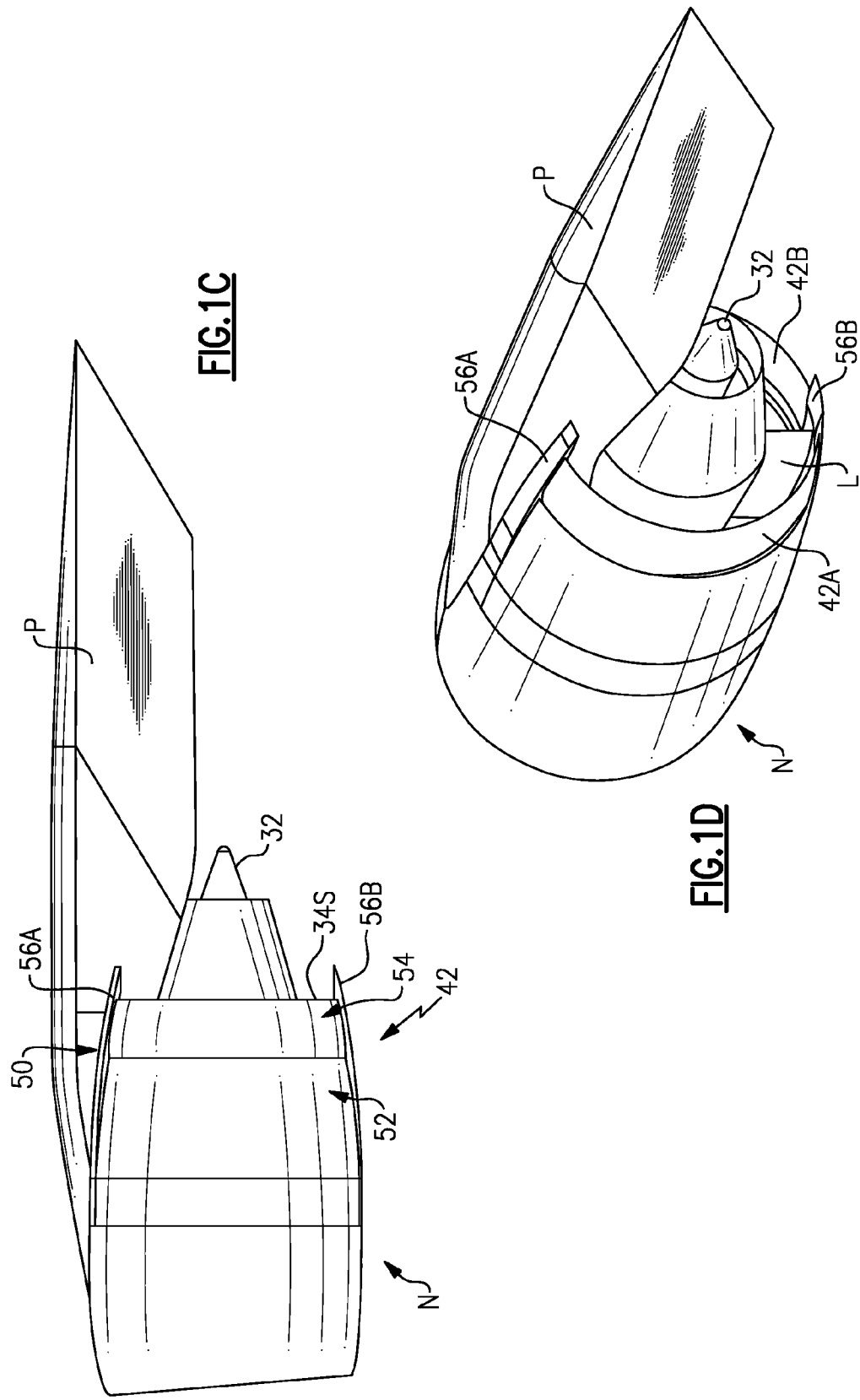

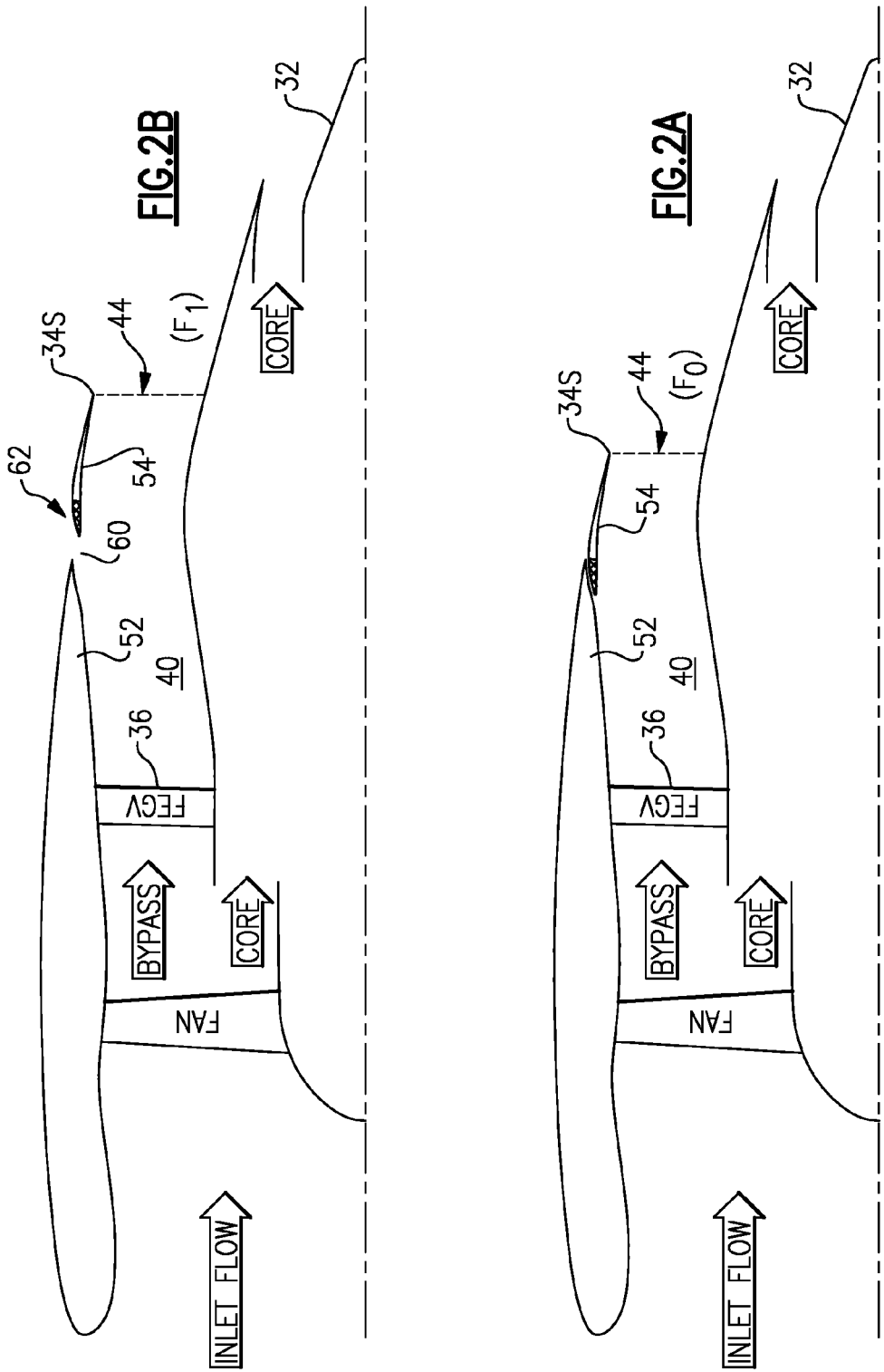

GAS TURBINE ENGINE WITH NOISE ATTENUATING VARIABLE AREA FAN NOZZLE

BACKGROUND

The present disclosure relates to a gas turbine engine, and more particularly to a turbofan engine having a variable area fan nozzle (VAFN) which mitigates acoustic response to reduce total effective perceived noise level (EPNL).

Gas turbine engines which have an engine cycle modulated with a variable area fan nozzle (VAFN) provide a smaller fan nozzle exit area during cruise conditions and a larger fan nozzle exit area during take-off and landing conditions.

The VAFN may generate noise as upstream turbulence interacts with the leading edge of the VAFN.

SUMMARY

A nacelle assembly for a bypass gas turbine engine according to an exemplary aspect of the present disclosure includes a variable area fan nozzle in communication with a fan bypass flow path, the variable area fan nozzle having a first fan nacelle section and a second fan nacelle section. The second fan nacelle section is axially movable relative to the first fan nacelle section to define an auxiliary port to vary a fan nozzle exit area and adjust fan bypass airflow, the second fan nacelle section includes an increased airfoil leading edge region relative to a baseline configuration.

A method of reducing a total effective perceived noise level (EPNL) of a gas turbine engine with a variable area fan nozzle according to an exemplary aspect of the present disclosure includes: defining an airfoil leading edge region of the second fan nacelle section by increasing the elliptical contour along its semi-minor axis relative to a baseline configuration and rotating the elliptical contour to align tangentially to a suction surface of the airfoil leading edge region to increase an airfoil leading edge radius relative to a baseline configuration of radius less than 0.05 δ where δ represents an upstream boundary layer thickness to reduce boundary layer turbulence ingestion leading edge noise.

BRIEF DESCRIPTION OF THE DRAWINGS

The various features and advantages of this disclosure will become apparent to those skilled in the art from the following detailed description of the currently preferred embodiment. The drawings that accompany the detailed description can be briefly described as follows:

FIG. 1C is a side view of the engine integrated with a pylon;

FIG. 1D is a rear perspective view of the engine integrated with a pylon;

FIG. 2A is a sectional side view of the VAFN in a closed position;

FIG. 2B is a sectional side view of the VAFN in an open position;

DETAILED DESCRIPTION

Figure 1A:
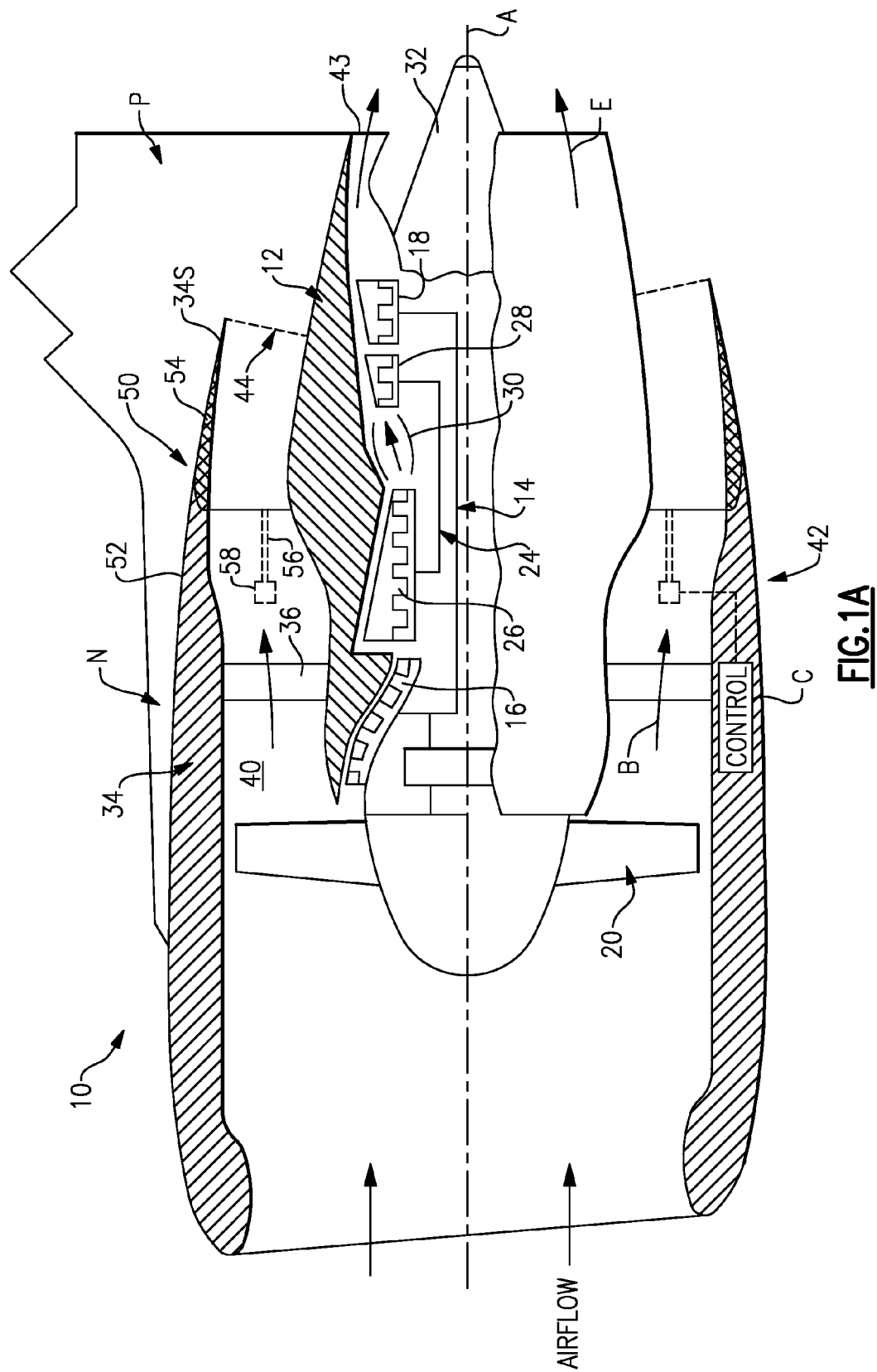
FIG. 1A is a general schematic partial fragmentary view of an exemplary gas turbine engine embodiment for use with the present disclosure.

FIG. 1A illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 either directly or through a gear architecture. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A. It should be understood, however, that this disclosure is applicable to various other gas turbine engines.

Airflow enters a fan nacelle 34, which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with, respective, spools 24, 14 to rotationally drive the compressors 26, 16 and the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by circumferentially space structures 36 often generically referred to as Fan Exit Guide Vanes (FEGVs). A bypass flow path 40 is defined between the core nacelle 12 and the fan nacelle 34. The engine 10 generates a bypass flow arrangement with a bypass ratio in which substantial percent of the airflow which enters the fan nacelle 34 becomes bypass flow B. The bypass flow B communicates through the generally annular bypass flow path 40 and is discharged from the engine 10 through a variable area fan nozzle (VAFN) 42 which defines a nozzle exit area 44 between the fan nacelle 34 and the core nacelle 12 at a fan nacelle end segment 34S of the fan nacelle 34 downstream of the fan section 20.

Thrust is a function of air density, velocity/acceleration, and air mass through the area. One or more of these parameters can be manipulated to vary the amount and direction of thrust provided by the bypass flow B. The VAFN 42 operates to effectively vary the area of the fan nozzle exit area 44 to selectively adjust the pressure ratio of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is preferably designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 1B:
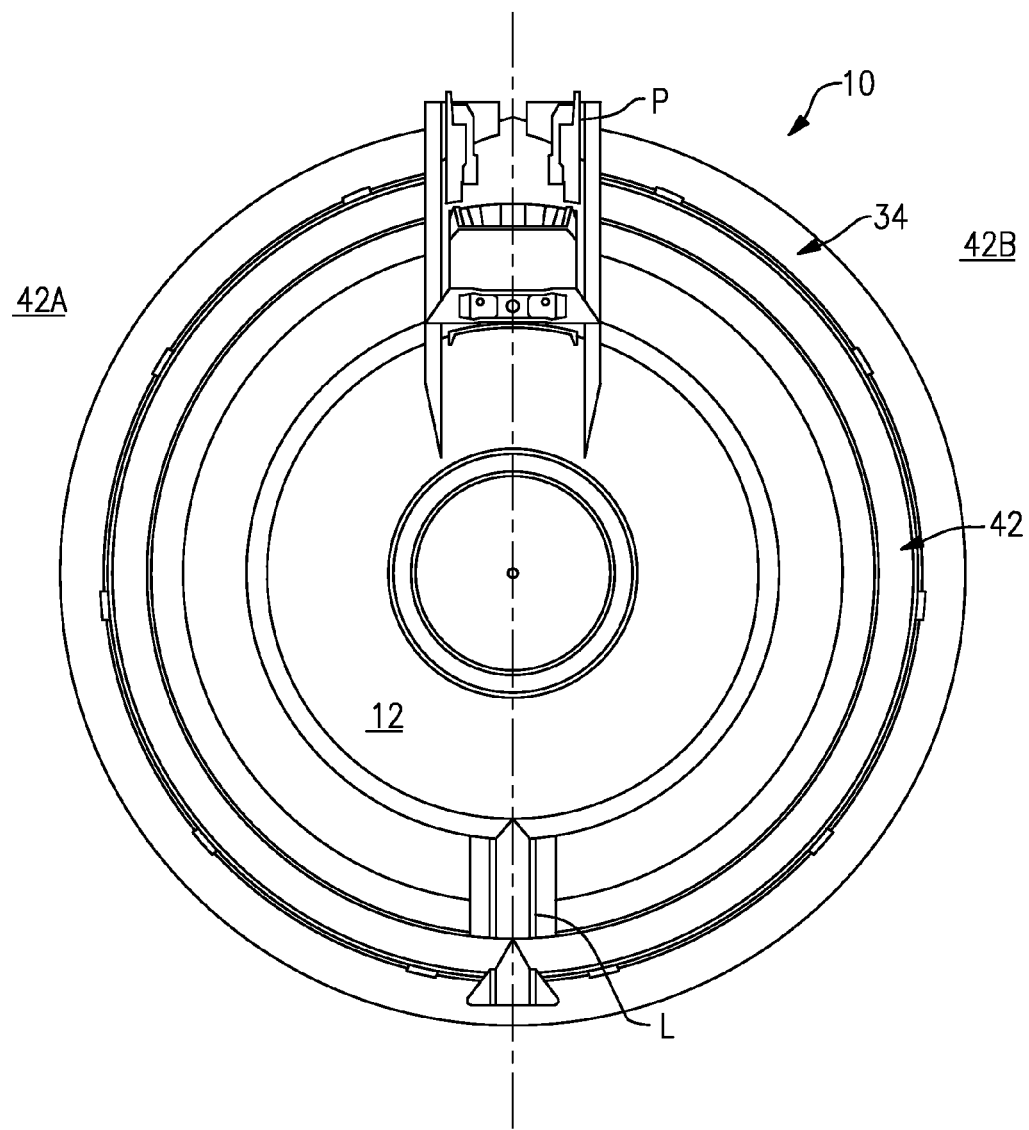
FIG. 1B is a rear view of the engine.

The VAFN 42 may be separated into at least two sectors 42A-42B (FIG. 1B) defined between the pylori P and a lower Bi-Fi splitter L which typically interconnects a larger diameter fan duct reverser cowl and a smaller diameter core cowl (FIGS. 1C and 1D). Each of the at least two sectors 42A-42B are independently adjustable to asymmetrically vary the fan nozzle exit area 44 to generate vectored thrust. It should be understood that although two segments are illustrated, any number of sectors and segments may alternatively or additionally be provided.

The VAFN 42 generally includes an auxiliary port system 50 having a first fan nacelle section 52 and a second fan nacelle section 54 movably mounted relative the first fan nacelle section 52. The second fan nacelle section 54 axially slides along the engine axis A relative the fixed first fan nacelle section 52 to change the effective area of the fan nozzle exit area 44. The second fan nacelle section 54, in one non-limiting embodiment, slides aftward upon a track fairing 56A, 56B (illustrated schematically in FIGS. 1C and 1D) in response to an actuator 58 (illustrated schematically). The track fairing 56A, 56B extend from the first fan nacelle section 52 adjacent the respective pylon P and the lower Bi-Fi splitter L (FIG. 1D).

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIG. 2A) and an open position (FIG. 2B). The auxiliary port system 50 is closed by positioning the second fan nacelle section 54 in-line with the first fan nacelle section 52 to define the fan nozzle exit area 44 as exit area F0 (FIG. 2A).

The VAFN 42 is opened by moving the second fan nacelle section 54 aftward along the track fairing 56A, 56B away from the first fan nacelle section 52 to open an auxiliary port 60 (FIG. 2B) which extends between the open second fan nacelle section 54 relative the first fan nacelle section 52 to essentially provide an increased fan nozzle exit area 44 exit area F1. That is, the exit area F1 with the auxiliary port 60 (FIG. 2B) is greater than exit area F0 (FIG. 2A).

In one non-limiting embodiment, the auxiliary port 60 is incorporated within the bypass flow path 40 aft of the Fan Exit Guide Vanes 36 (FEGVs). The auxiliary port 60 is located through the bypass duct outer wall. It should be understood that various forms of port arrangements are encompassed hereby.

In operation, the VAFN 42 communicates with the controller C to move the second fan nacelle section 54 relative the first fan nacelle section 52 of the auxiliary port system 50 to effectively vary the area defined by the fan nozzle exit area 44. Various control systems including an engine controller or an aircraft flight control system may also be usable with the present disclosure. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

Figure 3:
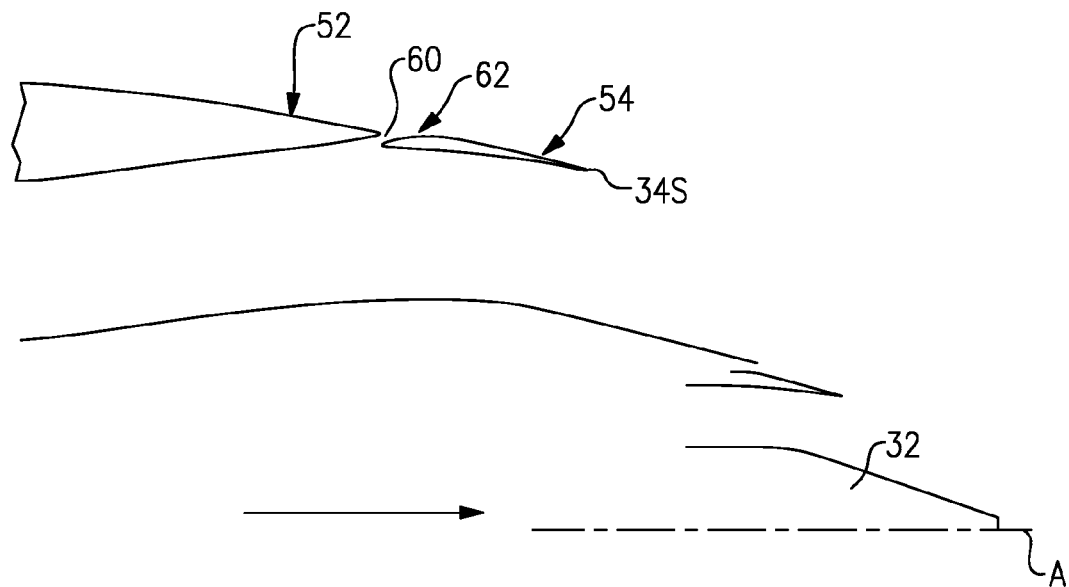
FIG. 3 is a sectional side view of the VAFN with an increased airfoil leading edge radius relative to a baseline configuration.
Figure 4:
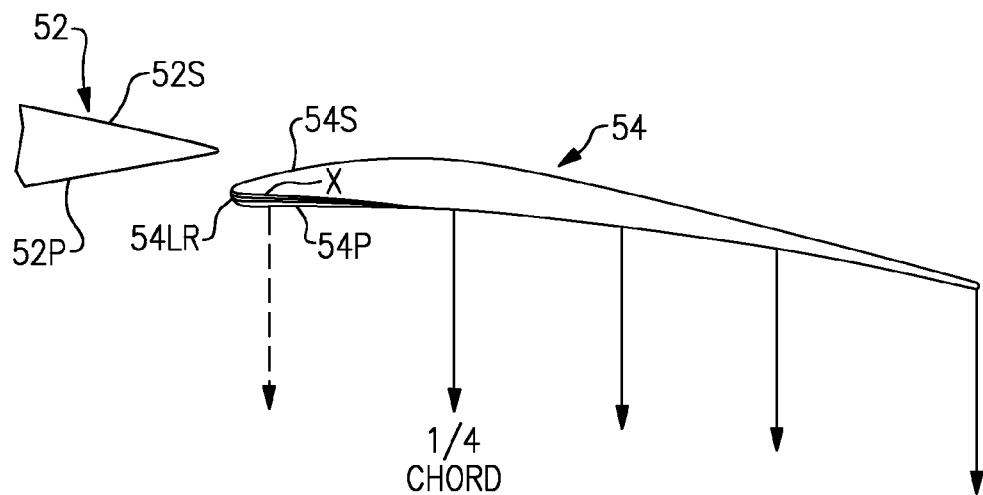
FIG. 4 is an expanded sectional side view of the VAFN with an increased airfoil leading edge radius relative to a baseline configuration radius of 0.05 δ where δ is an upstream boundary layer thickness.

Referring to FIG. 3, the second fan nacelle section 54 includes a leading edge region 62 with an increased airfoil leading edge radius of approximately 0.1 $\delta$-0.5 $\delta$ relative to a baseline configuration X. The baseline configuration X contemplates a chamfered or minor radiused leading edge in which the baseline configuration X is approximately 0.05 $\delta$, where $\delta$ is an upstream boundary layer thickness (FIGS. 4 and 5).

Upstream turbulence has been determined to result from turbulent boundary layers which expand from the upstream fixed nacelle wall, turbulence which evolves from the upstream fan exit guide vane (FEGV) wakes or endwall effects, and flow separation that may occur from the contour of the upstream fixed nacelle wall. The acoustic response of the VAFN is driven by a similar mechanism as that of airfoil turbulence ingestion leading edge noise. This source distribution is dipole in nature and may not exhibit a significant reduction in forward flight. This source behavior may lead to a significant sideline and aft angle contribution, thereby increasing the aircraft effective perceived noise level (EPNL).

Figure 5:
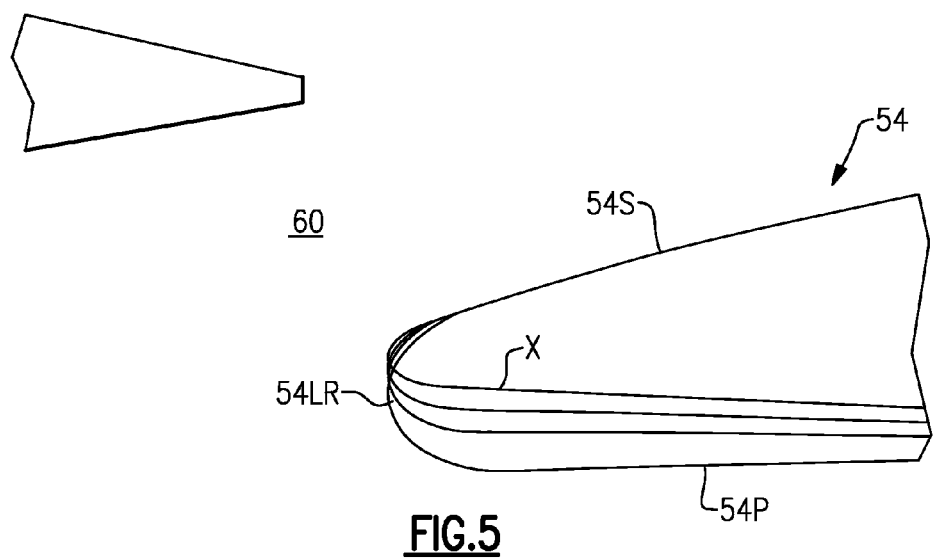
FIG. 5 is an expanded sectional side view of the increased airfoil leading edge radius relative to a baseline configuration.

In one non-limiting embodiment, a suction surface 54S of the second fan nacelle section 54 airfoil is held constant to maintain port exit flow area, as a leading edge radius 54LR on a pressure surface 54P is altered to provide the increased airfoil leading edge radius 54LR relative the baseline configuration X (FIG. 5). The increased airfoil leading edge radius 54LR in one non-limiting embodiment is confined to approximately the first quarter chord of the second fan nacelle section 54, with changes to the immediate leading edge region 62 and relatively less deviation from the baseline configuration X over the chordal distance toward a trailing edge 34S. The change to the pressure surface 54P is one affected over the first quarter (¼) chord of the airfoil shape resulting in only a local limited induct area change with no impact to overall fan nozzle exit area. In a closed configuration, the increased leading edge creates a step height, which may increase induct losses. A balance may thereby be realized between this loss and the noise benefit, or the pressure surface 52P of the first fan nacelle section 52 should be modified to accommodate the increased airfoil leading edge. Through redefinition of a pressure surface 54P to correspond with an increase in the airfoil leading edge radius relative to the baseline configuration X, the total effective perceived noise level (EPNL) is reduced.

Figure 6:
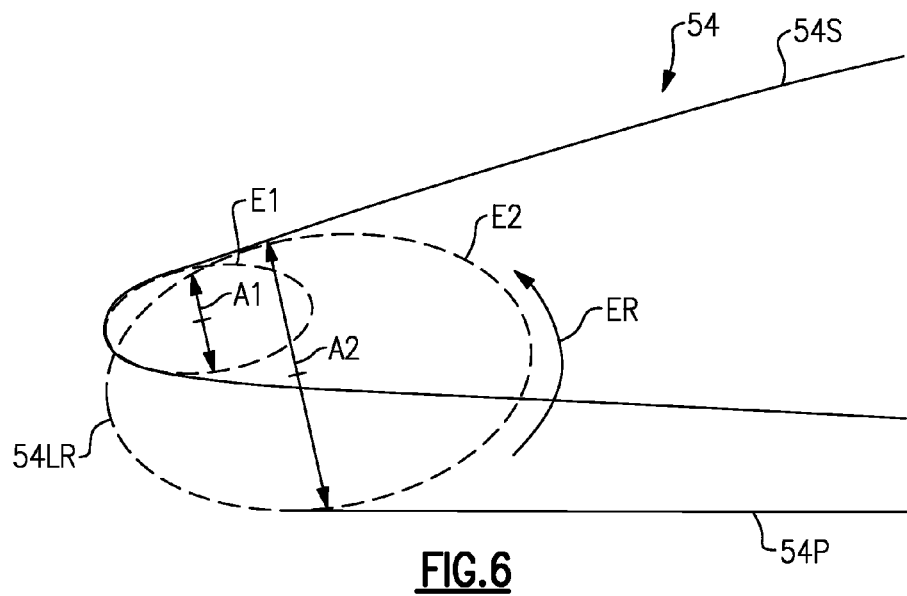
FIG. 6 is a schematic view of a geometric method to increase the airfoil leading edge radius relative to a baseline configuration.

Referring to FIG. 6, to effectuate an increase in the leading edge radius 54LR, an elliptical contour E1 that defines the airfoil leading edge shape in the baseline configuration X is increased along a semi-minor axis (A1 to A2) to define a larger elliptical contour E2 then rotated (illustrated schematically by arrow ER) to align tangentially to the suction surface 54S. This preserves much of the aerodynamic characteristics of the baseline configuration X with only the overall thickness, i.e. height of elliptical contour's semi-minor axis (E1 to E2), being manipulated. The VAFN operates to increase fan nozzle exit area 44, however, the port system 50 forms the bulk of the area increase. This increase in leading edge radius generally maintains the overall nozzle exit area 44, but affects only the pressure surface of the leading edge region of the port system 50.

The method disclosed herein has demonstrated considerable potential for leading edge noise reduction in the dominant frequency range of the baseline airfoil shape, for an increase of approximately 150% in leading edge radius 54LR. This noise reduction exhibits a non-linear dependency on the proximity of the second fan nacelle section 54 to the upstream first fan nacelle section 52 to provide an increased acoustic reduction as the VAFN 42 moves toward the open position. Maximum leading edge radius 54LR may be constrained with regard to the bypass flow when the VAFN 42 is in the closed position (FIG. 2A). That is, the leading edge radius 54LR may be increased to a size which maximizes the reduction in boundary layer turbulence ingestion through port 60 but minimizes the impact on bypass flow when the VAFN 42 is in a closed position (FIG. 2B).

Flow properties of the ingested boundary layer, such as turbulence level, integral length scale, and Mach number, also play a role, however, based on fixed upstream conditions, a noise improvement upwards of 3 dB in sound power level 3 can be expected at high Mach number, with further improvement attained at a low Mach number operations. With the second fan nacelle section 54 in an open position, upwards of 5 dB has been expected.

The method disclosed herein preserves an area of the auxiliary port 60 as well as internal area distribution, as only a relatively minimal change to the airfoil mean camber is required to include both tone and broadband acoustic reductions. The change to the pressure surface 54P is one affected over the first quarter (¼) chord of the airfoil shape resulting in only a local limited induct area change with minimal impact to overall fan nozzle exit area. In a closed configuration, the increased leading edge creates a step height, which may increase induct losses. A balance may thereby be realized between this loss and the noise benefit.

The foregoing description is exemplary rather than defined by the limitations within. Many modifications and variations of the present disclosure are possible in light of the above teachings. The preferred embodiments of this disclosure have been disclosed, however, one of ordinary skill in the art would recognize that certain modifications would come within the scope of this disclosure. It is, therefore, to be understood that within the scope of the appended claims, the disclosure may be practiced otherwise than as specifically described. For that reason the following claims should be studied to determine the true scope and content of this disclosure.

What is claimed is:

1. A method of reducing a total effective perceived noise level of a gas turbine engine with a variable area fan nozzle in communication with a fan bypass flow path, the variable area fan nozzle having a first fan nacelle section and a second fan nacelle section, the second fan nacelle section axially movable relative the first fan nacelle section to define an auxiliary port to vary a fan nozzle exit area and adjust a fan bypass airflow comprising:
   defining an airfoil leading edge region of the second fan nacelle section by an elliptical contour which defines a baseline configuration with a radius less than $0.05\delta$ where $\delta$ represents an upstream boundary layer thickness;
   increasing the semi-minor axis relative to the baseline configuration; and
   rotating the elliptical contour to align tangentially to a suction surface of the airfoil leading edge region to increase an airfoil leading edge radius relative to a baseline configuration to reduce boundary layer turbulence ingestion leading edge noise.

2. The method as recited in claim 1, further comprising:
   maintaining the suction surface constant relative to the baseline configuration; and
   altering a leading edge curvature of a pressure surface to define the increased airfoil leading edge radius.

3. The method as recited in claim 1, further comprising:
   defining the leading edge region along an approximately first quarter chord of the second fan nacelle section.

4. The method as recited in claim 1, further comprising:
   redefining a pressure surface, corresponding to the increase in semi minor axis, to align tangentially, to increase the airfoil leading edge radius relative to the baseline configuration of radius $<0.05\delta$ to reduce boundary layer turbulence ingestion leading edge noise.

5. The method as recited in claim 1, wherein the leading edge radius is increased to $0.1\delta$ to $0.5\delta$.

* * * * *